J. LAMPRECHT.
AUTOMOBILE JACK.
APPLICATION FILED SEPT. 10, 1915.
1,217,609.
Patented Feb. 27, 1917.
2 SHEETS—SHEET 1.
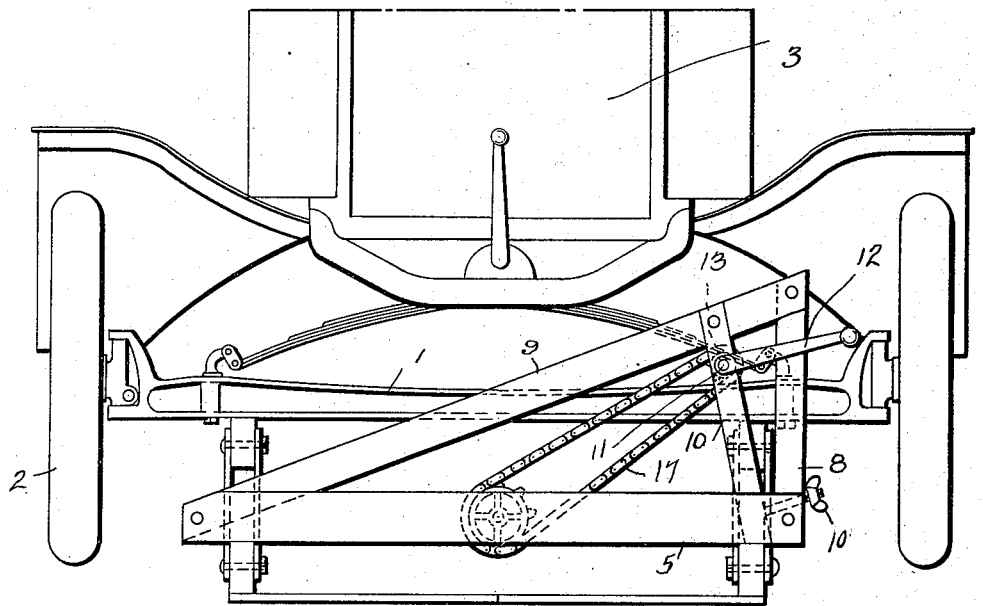
Fig. 1.
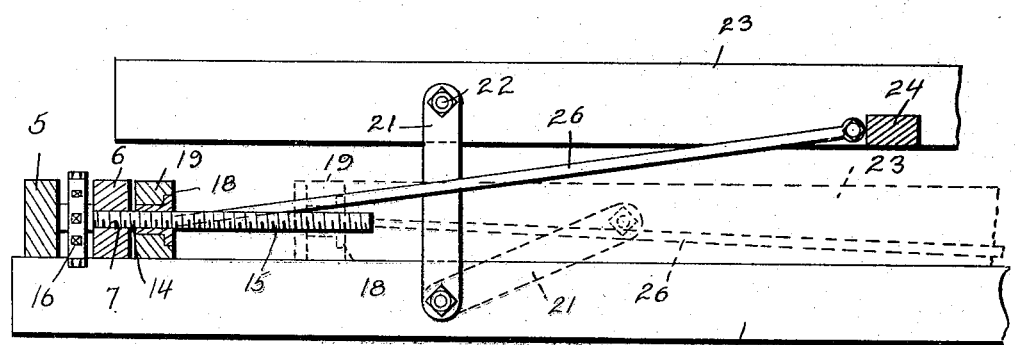
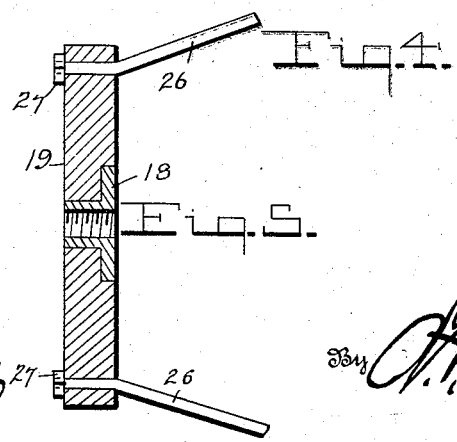
Fig. 4.
Fig. 5.
Witnesses
Inventor
J. Lamprecht
By
Attorney

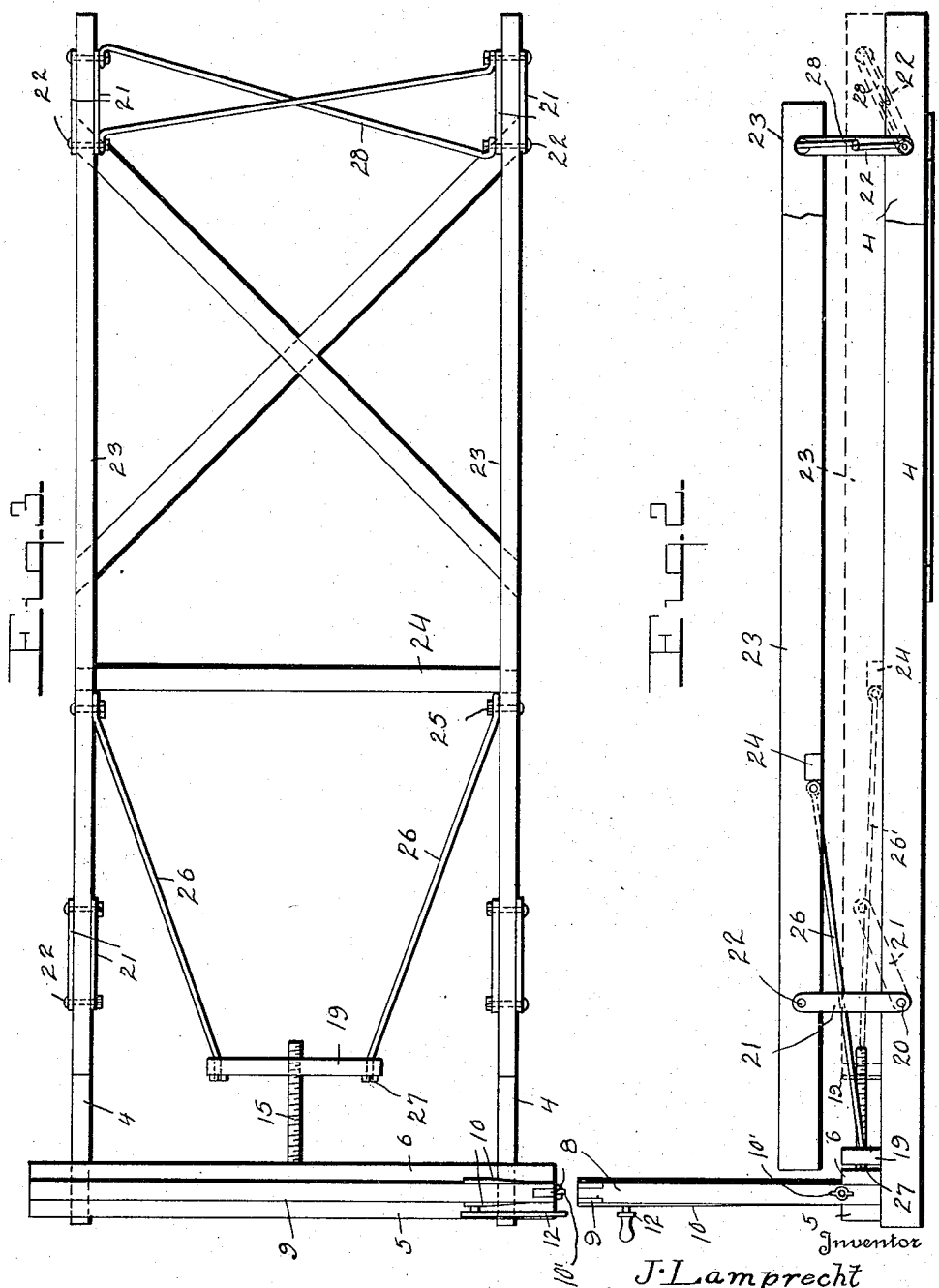

UNITED STATES PATENT OFFICE.

JOHN LAMPRECHT, OF SUMNER, IOWA.

AUTOMOBILE-JACK.

1,217,609.  Specification of Letters Patent.  Patented Feb. 27, 1917.

Application filed September 10, 1915. Serial No. 50,018.

*To all whom it may concern:*

Be it known that I, JOHN LAMPRECHT, a citizen of the United States, residing at Sumner, in the county of Bremer and State of Iowa, have invented certain new and useful Improvements in Automobile-Jacks; and I do hereby declare the following to be a full, clear, and exact description of the invention, such as will enable others skilled in the art to which it appertains to make and use the same.

This invention relates to new and useful improvements in automobile jacks, and the principal object of the device is to provide a means for readily raising motor vehicles from the ground and holding the same in a raised position until it is desired that they should be released.

Another object of the invention is to provide a jack which is so constructed as to be easily operated with little or no exertion on the part of the user.

A further object of the invention is to provide a jack which is capable of being used to hold the car off of the tires when the same is not in use.

With these and other objects in view, the invention consists in the novel combination and arrangement of parts which will be fully set forth in the following specification and accompanying drawings, in which:

Figure 1 is a view illustrating this improved jack as it would appear with a car thereon, showing the car lifted from the ground.

Fig. 2 is a side view in elevation of the jack, showing the same raised,

Fig. 3 is a top plan view of Fig. 2,

Fig. 4 is a fragmentary enlarged view, partly in section, illustrating the raising mechanism for the jack in detail, and Fig. 5 is a horizontal sectional view through a fragment of the operating mechanism.

Referring in detail to the drawings, the numeral 1 designates the front axle of a motor vehicle of the ordinary construction provided with the usual wheels having tires 2 thereon. This front axle supports the vehicle, designated generally by the numeral 3, and rests on the supporting bars of the jack, which will be more fully hereinafter described.

The jack above referred to comprises the base bars 4 which are held in spaced parallel relation, as illustrated in Fig. 3. The forward ends of these base bars are connected by a pair of parallel bars 5 and 6 and the bar 6 is formed with a central opening 7, the use of which will appear as the description proceeds. Extending upwardly from one end of the bars 5 and 6 is a standard 8 and extending downwardly from the upper end of the standard is a bar 9, which joins the opposite ends of the bars 5 and 6. A suitable downwardly inclined bar 10 extends downwardly from a point on the bar 9 near the point where it joins the bar 8 and mounted in this bar 10 is a stub shaft 11 carrying the crank 12, the inner end of which is provided with a sprocket 13, the use of which will appear as the description proceeds. It will be noted that the lower end of this bar 10 is held in various adjusted positions by means of the adjusting nut designated by the character 10′ which bears against the lower end of the upright 8 and is threaded on a suitable threaded pin extending laterally from the bar 10 as clearly shown in Fig. 1. Rotatably mounted in the opening 7 of the bar 6 is a shaft 14 provided with the threaded extension 15 and secured to the opposite end of this shaft is a sprocket 16 over which the chain 17 passes, which also passes over the sprocket 13, so that when the sprocket 13 is turned the sprocket 16 will also be turned, thereby turning the screw 15.

Threaded on the screw 15 is a bushing 18, which is secured in the traveler bar 19, which is slidable longitudinally of the device and forms a cross head to which the pulling rods, which will be more fully hereinafter described, are secured.

Pivoted to the base bars 4, as at 20, are the links 21, the upper ends of which are pivoted, as at 22, to the supporting bars 23, which are held in spaced parallel relation by the transverse connecting bar 24. Secured to the lifting bars 23, at 25, are the pulling rods 26, the forward ends of which are connected, as at 27, to the cross head 19. As shown in the drawings there is a pair of links 21 secured to opposite ends of each of the bars 4 and 23 and the links at the rear end are connected to opposite sides by the rods 28, which are arranged to extend from the lower pivot of one of the links to the upper pivot of the link on the opposite side and vice versa.

It will be apparent from the foregoing that in use the device is lowered and the car is driven thereover, whereupon the operator turns the crank 12 in a clockwise direction, thus causing the screw to rotate and to exert pull on the bars 26 to move the supporting bars 23 forwardly so that they will rise due to the movement of the links 21 and engage the under sides of the axles of the vehicle, thereby lifting the same clear of the ground. It will be evident that the device will remain in its raised position until the crank is turned in a counterclockwise direction and thus the car will be supported.

While in the foregoing there has been shown and described the preferred embodiment of this invention, it is to be understood that such changes may be made in the combination and arrangement of parts as will fall within the spirit and scope of the appended claims.

What I claim is:

1. A jack of the character described comprising a base, links pivoted to the base, side bars pivoted to upper ends of the links, a pair of transverse bars arranged across the forward ends of said base, a screw rotatably mounted centrally through one of said bars, a sprocket wheel carried by said screw, a cross head threaded on the screw, a vertical standard having its lower end connected to said transverse bars, a brace bar having its upper end connected to the upper end of said standard and its lower end connected to the transverse bars, a supporting bar pivotally secured to the brace bar, a shaft rotatably mounted in said supporting bar, sprocket wheel carried by said shaft, a chain mounted over said sprocket wheels of the shaft and screw, and means on the lower end of said supporting bar coöperating with the standard for varying the adjustment of said bar for tensioning said chain.

2. A jack of the character described comprising a base, a pair of spaced transverse bars arranged across and connected to the forward end of said base, a screw rotatably mounted centrally through one of said bars, a sprocket on the end of the screw, a standard connected to and rising vertically from one end of said bars, a diagonal brace bar connected to the upper end of the standard, its opposite end connected to the free ends of said transverse bars, a supporting bar pivotally secured to the brace bar and depending downwardly therefrom and located between the spaced transverse bars, a shaft journaled in said supporting bar, a sprocket carried by said shaft, a chain passing over the sprockets, a crank for manually rotating the shaft, links pivoted to the sides of the base, side bars pivoted to the upper ends of the links, a cross head threaded on the screw whereby upon turning said screw, the said cross head will be moved longitudinally of the base, rods connecting the cross heads with the side bars for raising the same upon rotation of the crank shaft, and means in the lower end of the supporting bar coöperating with the standard for adjusting the tension of said chain.

In testimony whereof I affix my signature in presence of two witnesses.

JOHN LAMPRECHT.

Witnesses:
 CHAS. LAMPRECHT,
 E. M. CASS.

Copies of this patent may be obtained for five cents each, by addressing the "Commissioner of Patents, Washington, D. C."